(12) United States Patent  (10) Patent No.: US 8,373,830 B2
Kikkawa et al.  (45) Date of Patent: Feb. 12, 2013

(54) LIQUID CRYSTAL DISPLAY DEVICE

(75) Inventors: Hironori Kikkawa, Tokyo (JP);
Michiaki Sakamoto, Tokyo (JP); Yuichi Yamaguchi, Tokyo (JP); Hidenori Ikeno, Tokyo (JP); Fumihiko Matsuno, Tokyo (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 13/205,204

(22) Filed: Aug. 8, 2011

(65) Prior Publication Data
US 2011/0285946 A1 Nov. 24, 2011

Related U.S. Application Data

(62) Division of application No. 12/076,476, filed on Mar. 19, 2008, now abandoned, which is a division of application No. 11/178,463, filed on Jul. 12, 2005, now Pat. No. 7,522,254, which is a division of application No. 10/059,183, filed on Jan. 31, 2002, now Pat. No. 6,937,302.

(30) Foreign Application Priority Data

Jan. 31, 2001 (JP) .................................. 2001-24237

(51) Int. Cl.
*G02F 1/1335* (2006.01)
(52) U.S. Cl. ....................................................... 349/113
(58) Field of Classification Search .................... 349/113
See application file for complete search history.

(56) References Cited

U.S. PATENT DOCUMENTS

| 5,500,750 | A | 3/1996 | Kanbe et al. |
| 5,668,379 | A | 9/1997 | Ono et al. |
| 5,684,551 | A | 11/1997 | Nakamura et al. |
| 5,760,854 | A | 6/1998 | Ono et al. |
| 6,291,146 | B1 * | 9/2001 | Chang et al. ................... 430/394 |
| 6,310,675 | B1 | 10/2001 | Yaniv |
| 6,342,935 | B1 * | 1/2002 | Jang et al. ...................... 349/113 |
| 6,351,298 | B1 | 2/2002 | Mitsui et al. |
| 6,400,425 | B1 | 6/2002 | Kim et al. |
| 6,559,917 | B2 | 5/2003 | Ikeno |
| 6,623,999 | B1 | 9/2003 | Nishikawa |
| 6,690,434 | B1 | 2/2004 | Yamazaki et al. |
| 6,747,718 | B2 | 6/2004 | Kanou et al. |
| 6,784,957 | B2 | 8/2004 | Kanou et al. |
| 7,215,394 | B2 | 5/2007 | Kanou et al. |

(Continued)

FOREIGN PATENT DOCUMENTS

| JP | 6-160833 | 6/1994 |
| JP | 10-307305 | 11/1998 |

(Continued)

OTHER PUBLICATIONS

JP Office Action mailed Jul. 27, 2010 in corresponding Japanese Application No. 2001-024237 and English translation of wavy lined portion.

*Primary Examiner* — Timothy L Rude
(74) *Attorney, Agent, or Firm* — Young & Thompson

(57) ABSTRACT

A liquid crystal display device including a first substrate, a second substrate facing and spaced away from the first substrate, a liquid crystal layer sandwiched between the first and second substrates, a switching device formed on the first substrate, a first electrically insulating film randomly patterned on the first substrate, a second electrically insulating film covering the first electrically insulating film therewith, and having a wavy surface, and a reflection electrode formed on the second electrically insulating film, and electrically connected to an electrode of the switching device, wherein a light passing through the second substrate and the liquid crystal layer is reflected at the reflection electrode, and the second electrically insulating film extends outwardly from the first electrically insulating film by a certain length at an end of a display region in which images are to be displayed, such that a step formed by the first and second electrically insulating films in the vicinity of the end of the display region is smoothed.

11 Claims, 13 Drawing Sheets

FOREIGN PATENT DOCUMENTS

| JP | 11-24101 | 1/1999 |
| --- | --- | --- |
| JP | 11-281993 | 10/1999 |
| JP | 2000-122094 | 4/2000 |
| JP | 2000-171794 | 6/2000 |
| JP | 2000-187210 | 7/2000 |

* cited by examiner

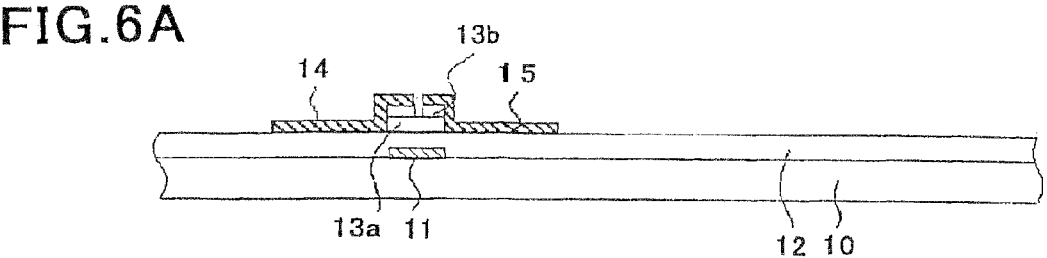
FIG.6A
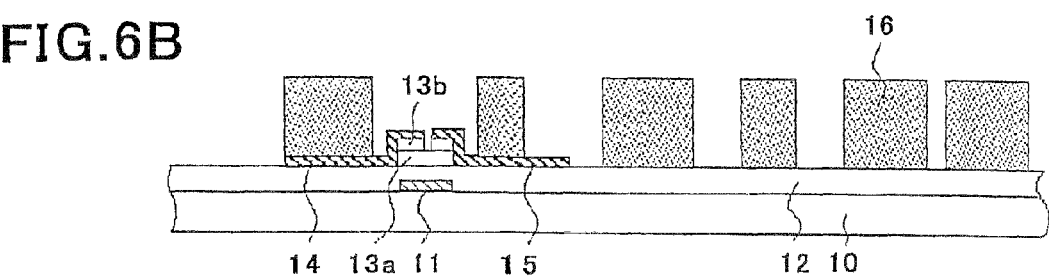
FIG.6B
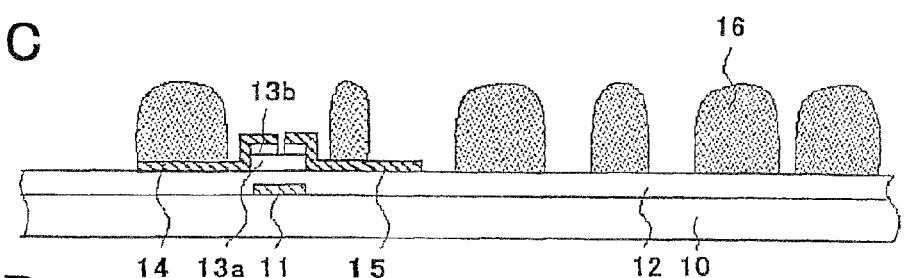
FIG.6C
FIG.6D
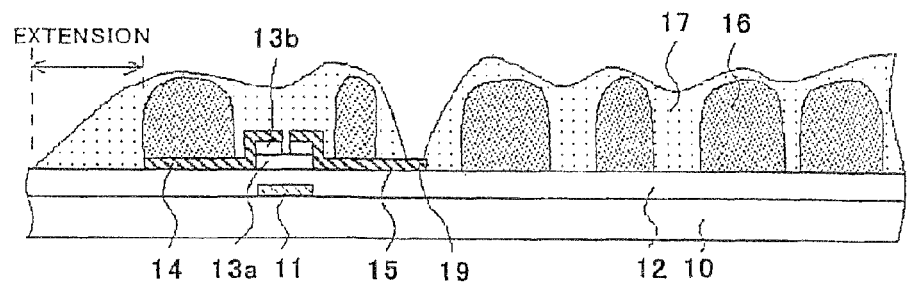

LIQUID CRYSTAL DISPLAY DEVICE

This application is a division of co-pending application Ser. No. 12/076,476 filed on Mar. 19, 2008, which is a division of application Ser. No. 11/178,463 filed on Jul. 12, 2005, which is a division of application Ser. No. 10/059,183 filed on Jan. 31, 2002, the entire contents of which are hereby incorporated by reference.

BACKGROUND OF THE INVENTION

1. Field of the Invention

The invention relates to a liquid crystal display device and a method of fabricating the same.

2. Description of the Related Art

A reflection type liquid crystal display device reflects an incident light at a reflection electrode formed therein towards a viewer. Accordingly, a reflection type liquid crystal display device is not necessary to include a light source such as a back light device, and thus, consumes less power and can be fabricated thinner and lighter than a light-transmission type liquid crystal display device. A reflection type liquid crystal display device is used mainly in a handy communication terminal.

Hereinbelow is explained a conventional reflection type liquid crystal display device with reference to FIG. 1 which is a plan view of a conventional reflection type liquid crystal display device, FIG. 2 which is a cross-sectional view taken along the line II-II in FIG. 1, and FIGS. 3A to 3H which are cross-sectional views each illustrating a step of a method of fabricating a substrate on which a thin film transistor (TFT) is to be fabricated. FIG. 1 illustrates pixels located at an outer periphery of a display area in which images are to be displayed. Electrode terminals and other parts are formed in areas located at upper and left sides of the illustrated pixels, outside the display area.

First, a structure of a conventional reflection type liquid crystal display device is explained hereinbelow with reference to FIGS. 1 and 2.

The illustrated conventional reflection type liquid crystal display device is comprised of a TFT substrate 5 on which a thin film transistor (TFT) is formed, an opposing substrate 6 facing and spaced away from the TFT substrate 5, and a liquid crystal display layer 4 sandwiched between the TFT substrate 5 and the opposing substrate 6.

The TFT substrate 5 is comprised of gate lines 1, drain lines 2 extending perpendicularly to the gate lines 1, switching devices each comprised of a thin film transistor 3 formed in each of pixel areas defined by the gate lines 1 and the drain lines 2, a reflection electrode 18 which reflects a light entering the pixel areas and applies a voltage to liquid crystal molecules in the liquid crystal layer 4, a first electrically insulating film 16 formed on the TFT substrate 5, and a second electrically insulating film 17 which cooperates with the first electrically insulating film 16 to present a wavy surface to the reflection electrode 18.

The thin film transistor 3 has a gate electrode 11 electrically connected to the gate line 1, a drain electrode 14 electrically connected to the drain line 2, and a source electrode 15 electrically connected to the reflection electrode 18.

As illustrated in FIG. 2, the TFT substrate 5 is comprised further of a first substrate 10 on which the gate electrode 11 is formed, a gate insulating film 12 formed entirely on the first substrate 10, an amorphous silicon layer 13a formed on the gate insulating film 12, and n+ amorphous silicon layers 13b formed on the amorphous silicon layer 13a.

The drain electrode 14 and the source electrode 15 extend covering both the n+ amorphous silicon layers 13b and the gate insulating film 12 therewith.

The first electrically insulating film 16 is randomly formed in each of pixels in the display area, and is covered with the second electrically insulating film 17 to smooth steps formed by the first electrically insulating film 16. The reflection electrode 18 has a wave surface showing a certain optical reflection characteristic, reflecting a wavy surface of the second electrically insulating film 17.

As illustrated in FIG. 2, the reflection electrode 18 is electrically connected to the source electrode 15 at a contact hole 19.

The opposing substrate 6 is comprised of a second substrate 20, a color filter 21 formed on a first surface of the second substrate 20, a common electrode 22 through which a voltage is applied to liquid crystal molecules in the liquid crystal layer 4, and a polarizing plate 23 formed on a second surface of the second substrate 20.

Liquid crystal molecules in the liquid crystal layer 4 are controlled by a voltage applied across the TFT substrate 5 and the opposing substrate 6.

An incident light 24 passing through the opposing substrate 6 and the liquid crystal layer 4 is reflected at the reflection electrode 18 having the wavy surface, and then, passes again through the liquid crystal layer 4 and the opposing substrate 6, and leaves the liquid crystal display device as an out-going light 25.

In the conventional liquid crystal display device, steep steps formed by the first electrically insulating film 16 randomly formed on the TFT substrate 5 are smoothed by the second electrically insulating film 17 thinner than the first electrically insulating film 16, as mentioned earlier. As a result, the reflection electrode 18 has a sufficiently wavy surface at which the incident light 24 is randomly reflected, ensuring that images can be displayed on a screen with uniform brightness.

Hereinbelow is explained a method of fabricating the TFT substrate 5 in the above-mentioned conventional liquid crystal display device with reference to FIGS. 3A to 3H. The thin film transistor 3 acting as a switching device has a reverse-stagger structure.

First, as illustrated in FIG. 3A, the gate electrode 11 and the gate line 1 are formed on the first substrate 10. Then, the gate insulating film 12 is formed on the first substrate 10, covering the gate electrode 11 therewith. Then, the amorphous silicon layer 13a is formed on the gate insulating film 12 above the gate electrode 11, and subsequently, the n+ amorphous silicon layer 13b is formed on the amorphous silicon layer 13a.

Then, the drain electrode 14 and the source electrode 15 are formed partially covering the n+ amorphous silicon layer 13b therewith and further partially covering the gate insulating film 12 therewith.

Then, the n+ amorphous silicon layers 13b is etched in its exposed area with the drain and source electrodes 14 and 15 being used as a mask, to thereby fabricate the thin film transistor 3. Then, the thin film transistor 3 is covered with a passivation film (not illustrated).

Then, as illustrated in FIG. 3B, the first electrically insulating films 16 composed of a resin are randomly formed in each of pixel regions. The electrically insulating films 16 are formed to have a thickness equal to or greater than a predetermined thickness in order to provide appropriate optical reflection characteristic to the reflection electrode 18.

Then, as illustrated in FIG. 3C, the first electrically insulating films 16 are heated to turn their sharp corners into rounded corners.

Then, as illustrated in FIG. 3D, the first electrically insulating films 16 are covered with the second electrically insulating film 17. Since the second electrically insulating film 17 is formed in order to smooth steps formed by the first electrically insulating films 16, if it is too thin, the steps formed by the first electrically insulating films 16 remain as they are, and if it is too thick, the second electrically insulating film 17 would have a planar surface. Hence, a thickness of the second electrically insulating film 17 is determined taking the optical reflection characteristic of the reflection electrode 18 into consideration.

Then, the second electrically insulating film 17 is removed in an area outside the display area, and concurrently removed partially above the source electrode 15 to form the contact hole 19 through which the reflection electrode 18 is electrically connected to the source electrode 15.

Then, as illustrated in FIG. 3E, a metal 18b having high reflectivity is deposited all over the first substrate 10.

Then, as illustrated in FIG. 3F, the metal 18b is entirely covered with a resist 26.

Then, as illustrated in FIG. 3G, the resist 26 is exposed to a light and subsequently developed such that a resist pattern 26a covers only an area in which the reflection electrode 18 is to be formed. Then, the metal 18b is etched for removal with the resist pattern 26 being used as a mask.

Thus, as illustrated in FIG. 3H, the reflection electrode 18 composed of the metal 18b is formed covering the second electrically insulating film 17 therewith. Then, the resist pattern 26a is removed.

The resultant reflection electrode 18 is electrically connected to the source electrode 15 in each of pixels. The reflection electrode 18 is removed at a boundary between pixel areas, that is, on both the gate line 1 and the drain line 2, and further in an area (an area located at the left in FIG. 3H) where electrode terminals are to be formed which area is outside the display area, in order that the reflection electrode 18 acts as a pixel electrode to apply a voltage to liquid crystal molecules in the liquid crystal layer 4.

However, the above-mentioned conventional liquid crystal display device and the above-mentioned method of fabricating the same are accompanied with the following problems.

In the step having been explained with reference to FIG. 3D, the second electrically insulating film 17 formed for smoothing the steps formed by the first electrically insulating films 16 is formed also on both the gate line 1 and the drain line 2 between adjacent pixels, in order to make it easy to remove the reflection electrode 18. In the area (which is located at the left in FIG. 3H) where electrode terminals are to be formed, located outside the display area, the second electrically insulating film 17 is removed at the same location as the first electrically insulating film 16, in order to render the area as small as possible and thereby fabricate a liquid crystal display device in a small size. As a result, as illustrated in FIG. 3H, the first and second electrically insulating films 16 and 17 have a steep cross-section at an end thereof.

Herein, it is assumed that the resist 26 is deposited entirely over the first substrate 10 with the first and second electrically insulating film 16 and 17 having a steep cross-section. The resist 26 would have a designed thickness in an area where the second electrically insulating film 17 covers the first electrically insulating film 16 therewith to thereby have a smooth upper surface, that is, in pixels or on the gate line 1 and the drain line 2 between adjacent pixels. In contrast, in the area where electrode terminals are to be formed, located outside the display area, the resist 26 would gather due to the steep cross-section, and resultingly, would have a thickness greater than a designed thickness.

Since the conditions for carrying out exposure of the resist 26 to a light and development of the resist 26 are determined based on a resist existing between pixels which resist is required to be exactly patterned, the resist 26 could not be completely removed at an end of the first and second electrically insulating films 16 and 17 having a great thickness, resulting in resist residue 26b, as illustrated in FIG. 3G.

The resist residue 26b would prevent the metal 18b existing therebelow from being etched, resulting in an non-removed portion 18a of the metal 18b, as illustrated in FIG. 3H.

If the portion 18a of the metal 18b remains not removed in an area where the metal 18b has to be all removed, as mentioned above and as illustrated in FIG. 3H, there would be unintentionally generated a parasitic capacity between the non-removed portion 18a and the gate and drain lines 1 and 2, resulting in remarkable degradation in display quality in the liquid crystal display device.

As an alternative, if the non-removed portion 18a of the metal 18b bridges over adjacent pixels, there would be caused a problem that the resultant reflection electrode 18 falls into short-circuit.

SUMMARY OF THE INVENTION

In view of the above-mentioned problems in the conventional liquid crystal display device and the method of fabricating the same, it is an object of the present invention to provide a liquid crystal display device and a method of fabricating the same both of which are capable of preventing unintentional generation of a parasitic capacity caused by a non-removed portion of a reflection electrode and further preventing a reflection electrode from falling into short-circuit between adjacent pixels.

In one aspect of the present invention, there is provided a liquid crystal display device including (a) a first substrate, (b) a second substrate facing and spaced away from the first substrate, (c) a liquid crystal layer sandwiched between the first and second substrates, (d) a switching device formed on the first substrate, (e) a first electrically insulating film randomly patterned on the first substrate, (f) a second electrically insulating film covering the first electrically insulating film therewith, and having a wavy surface, and (g) a reflection electrode formed on the second electrically insulating film, and electrically connected to an electrode of the switching device, wherein a light passing through the second substrate and the liquid crystal layer is reflected at the reflection electrode, the second electrically insulating film extends outwardly from the first electrically insulating film by a certain length at an end of a display region in which images are to be displayed, such that a step formed by the first and second electrically insulating films in the vicinity of the end of the display region is smoothed.

It is preferable that the certain length is in the range of about 10 µm to about 12 µm both inclusive.

It is preferable that the second electrically insulating film has a thickness in the range of about 0.3 µm to about 1.5 µm both inclusive.

It is preferable that the first electrically insulating film has a thickness in the range of about 1 µm to about 3 µm both inclusive.

For instance, the second electrically insulating film may be composed of thermo-flexible organic or inorganic material.

For instance, the first and second electrically insulating films may be composed of different materials from each other.

For instance, the first and second electrically insulating films may be composed of the same material having different viscosities from each other.

For instance, the first and second electrically insulating films may be composed of a combination of organic and inorganic materials.

There is further provided a liquid crystal display device including (a) a first substrate, (b) a second substrate facing and spaced away from the first substrate, (c) a liquid crystal layer sandwiched between the first and second substrates, (d) a switching device formed on the first substrate, (e) a first electrically insulating film randomly patterned on the first substrate, (f) a second electrically insulating film covering the first electrically insulating film therewith, and having a wavy surface, and (g) a reflection electrode formed on the second electrically insulating film, and electrically connected to an electrode of the switching device, wherein a light passing through the second substrate and the liquid crystal layer is reflected at the reflection electrode, the second electrically insulating film extends inwardly from the first electrically insulating film by a certain length at a contact region where the reflection electrode is electrically connected to the electrode of the switching device, such that a step formed by the first and second electrically insulating films in the vicinity of the contact region is smoothed.

There is still further provided a liquid crystal display device including (a) a first substrate, (b) a second substrate facing and spaced away from the first substrate, (c) a liquid crystal layer sandwiched between the first and second substrates, (d) a switching device formed on the first substrate, (e) an electrically insulating film formed on the first substrate, and defined by a thick region and a thin region, the electrically insulating film having a wavy surface, and (f) a reflection electrode formed on the electrically insulating film, and electrically connected to an electrode of the switching device, wherein a light passing through the second substrate and the liquid crystal layer is reflected at the reflection electrode, the thin region extends outwardly from the thick region by a certain length at an end of a display region in which images are to be displayed, such that a step formed by the electrically insulating film in the vicinity of the end of the display region is smoothed.

There is yet further provided a liquid crystal display device including (a) a first substrate, (b) a second substrate facing and spaced away from the first substrate, (c) a liquid crystal layer sandwiched between the first and second substrates, (d) a switching device formed on the first substrate, (e) an electrically insulating film formed on the first substrate, and defined by a thick region and a thin region, the electrically insulating film having a wavy surface, and (f) a reflection electrode formed on the electrically insulating film, and electrically connected to an electrode of the switching device, wherein a light passing through the second substrate and the liquid crystal layer is reflected at the reflection electrode, the thin region extends inwardly from the thick region by a certain length at a contact region where the reflection electrode is electrically connected to the electrode of the switching device, such that a step formed by the electrically insulating film in the vicinity of the contact region is smoothed.

In another aspect of the present invention, there is provided a method of fabricating a liquid crystal display device, including the steps at least of (a) randomly patterning a first electrically insulating film on a first substrate on which a switching device is fabricated, (b) covering the first electrically insulating film with a second electrically insulating film, and (c) forming a reflection electrode on a wavy surface of the first and second electrically insulating films such that the reflection electrode is electrically connected to an electrode of the switching device, the reflection electrode reflecting a light passing through both a second substrate facing and spaced away from the first substrate and a liquid crystal layer sandwiched between the first and second substrates, the step (b) including (b1) forming the second electrically insulating film over the first substrate such that the first electrically insulating film is entirely covered with the second electrically insulating film, and (b2) partially removing the second electrically insulating film such that the second electrically insulating film extends outwardly from the first electrically insulating film by a certain length at an end of a display region in which images are to be displayed, thereby a step formed by the first and second electrically insulating films in the vicinity of the end of the display region is smoothed.

It is preferable that the step (c) includes the steps of (c1) depositing a material of which the reflection electrode is composed, entirely over the second electrically insulating film, (c2) coating a resist over the material, (c3) removing the resist in an area in which the material is to be removed, and (c4) etching the material with the resist being used as a mask.

There is further provided a method of fabricating a liquid crystal display device, including the steps at least of (a) randomly patterning a first electrically insulating film on a first substrate on which a switching device is fabricated, (b) covering the first electrically insulating film with a second electrically insulating film, and (c) forming a reflection electrode on a wavy surface of the first and second electrically insulating films such that the reflection electrode is electrically connected to an electrode of the switching device, the reflection electrode reflecting a light passing through both a second substrate facing and spaced away from the first substrate and a liquid crystal layer sandwiched between the first and second substrates, the step (b) including (b1) forming the second electrically insulating film over the first substrate such that the first electrically insulating film is entirely covered with the second electrically insulating film, and (b2) partially removing the second electrically insulating film such that the second electrically insulating film extends inwardly from the first electrically insulating film by a certain length at a contact region where the reflection electrode is electrically connected to the electrode of the switching device, thereby a step formed by the first and second electrically insulating films in the vicinity of the contact region is smoothed.

It is preferable that the step (c) includes the steps of (c1) depositing a material of which the reflection electrode is composed, entirely over the second electrically insulating film, (c2) coating a resist over the material, (c3) removing the resist in an area in which the material is to be removed, and (c4) etching the material with the resist being used as a mask.

There is still further provided a method of fabricating a liquid crystal display device, including the steps at least of (a) randomly patterning an electrically insulating film on a first substrate on which a switching device is fabricated, the electrically insulating film having a wavy surface, and (b) forming a reflection electrode on the wavy surface of the electrically insulating film such that the reflection electrode is electrically connected to an electrode of the switching device, the reflection electrode reflecting a light passing through both a second substrate facing and spaced away from the first substrate and a liquid crystal layer sandwiched between the first and second substrates, the step (b) including (b1) forming the electrically insulating film over the first substrate, and (b2) patterning the electrically insulating film into a removal region in which the electrically insulating film is completely removed, a thin region in which the electrically insulating film remains as a thin film, and a thick region in which the electrically insulating film remains as a thick film such that the thin region extends outwardly from the thick region by a certain length at an end of a display region in which images are to be displayed, thereby a step formed by the electrically insulating film in the vicinity of the end of the display region is smoothed.

It is preferable that the electrically insulating film is patterned in the step (b2) in single exposure to a light through the use of a half-tone mask having a light-permeable portion for defining the removal region, a half-light-permeable portion for defining the thin region, and a light-impermeable portion for defining the thick region.

It is preferable that the half-light-permeable portion is located adjacent to the light-permeable portion.

It is preferable that the electrically insulating film is patterned in the step (b2) in single exposure to a light through the use of a photo mask having a light-permeable portion for defining the removal region, and a half-light-permeable portion for defining the thin region.

It is preferable that the electrically insulating film is patterned in the step (b2) in single exposure to a light through the use of a photo mask having such a fine pattern that a light to be directed to the thin region is attenuated.

There is yet further provided a method of fabricating a liquid crystal display device, including the steps at least of (a) randomly patterning an electrically insulating film on a first substrate on which a switching device is fabricated, the electrically insulating film having a wavy surface, and (b) forming a reflection electrode on the wavy surface of the electrically insulating film such that the reflection electrode is electrically connected to an electrode of the switching device, the reflection electrode reflecting a light passing through both a second substrate facing and spaced away from the first substrate and a liquid crystal layer sandwiched between the first and second substrates, the step (b) including (b1) forming the electrically insulating film over the first substrate, and (b2) patterning the electrically insulating film into a removal region in which the electrically insulating film is completely removed, a thin region in which the electrically insulating film remains as a thin film, and a thick region in which the electrically insulating film remains as a thick film such that the thin region extends inwardly from the thick region by a certain length at a contact region where the reflection electrode is electrically connected to the electrode of the switching device, thereby a step formed by the electrically insulating film in the vicinity of the contact region is smoothed.

The advantages obtained by the aforementioned present invention will be described hereinbelow.

In accordance with the present invention, the second electrically insulating film is designed to extend outwardly from the first electrically insulating film by a certain length at an end of a display region, and is further designed to have a thickness in a predetermined range. As an alternative, the second electrically insulating film is designed to extend inwardly from the first electrically insulating film by a certain length at a contact region. As a result, it would be possible to smooth a step formed by the first and second electrically insulating films in the vicinity of an end of the display region. This ensures that it would be possible to prevent a resist used for patterning the reflection electrode from gathering as a resist residue at an end of the first and second electrically insulating films. Thus, generation of an non-removed portion of a reflection electrode caused by the resist residue would be prevented, ensuring that it would be possible to avoid an unintentional parasitic capacity and prevent adjacent pixels from short-circuiting with each other. As a result, the present invention provides a liquid crystal display device having no non-uniformity in display and presenting high quality images.

Furthermore, the use of a half-tone mask or photo mask in the method of fabricating a liquid crystal display device would make it possible to form the first and second electrically insulating films of a common material in a single step, ensuring reduction in the number of fabrication steps.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIGS. 6A to 6H are cross-sectional views each illustrating a step of a method of fabricating a substrate on which a thin film transistor (TFT) is to be fabricated, in the reflection type liquid crystal display device illustrated in FIG. 4.

DESCRIPTION OF THE PREFERRED EMBODIMENTS

Preferred embodiments in accordance with the present invention will be explained hereinbelow with reference to drawings.

First Embodiment

Figure 4:
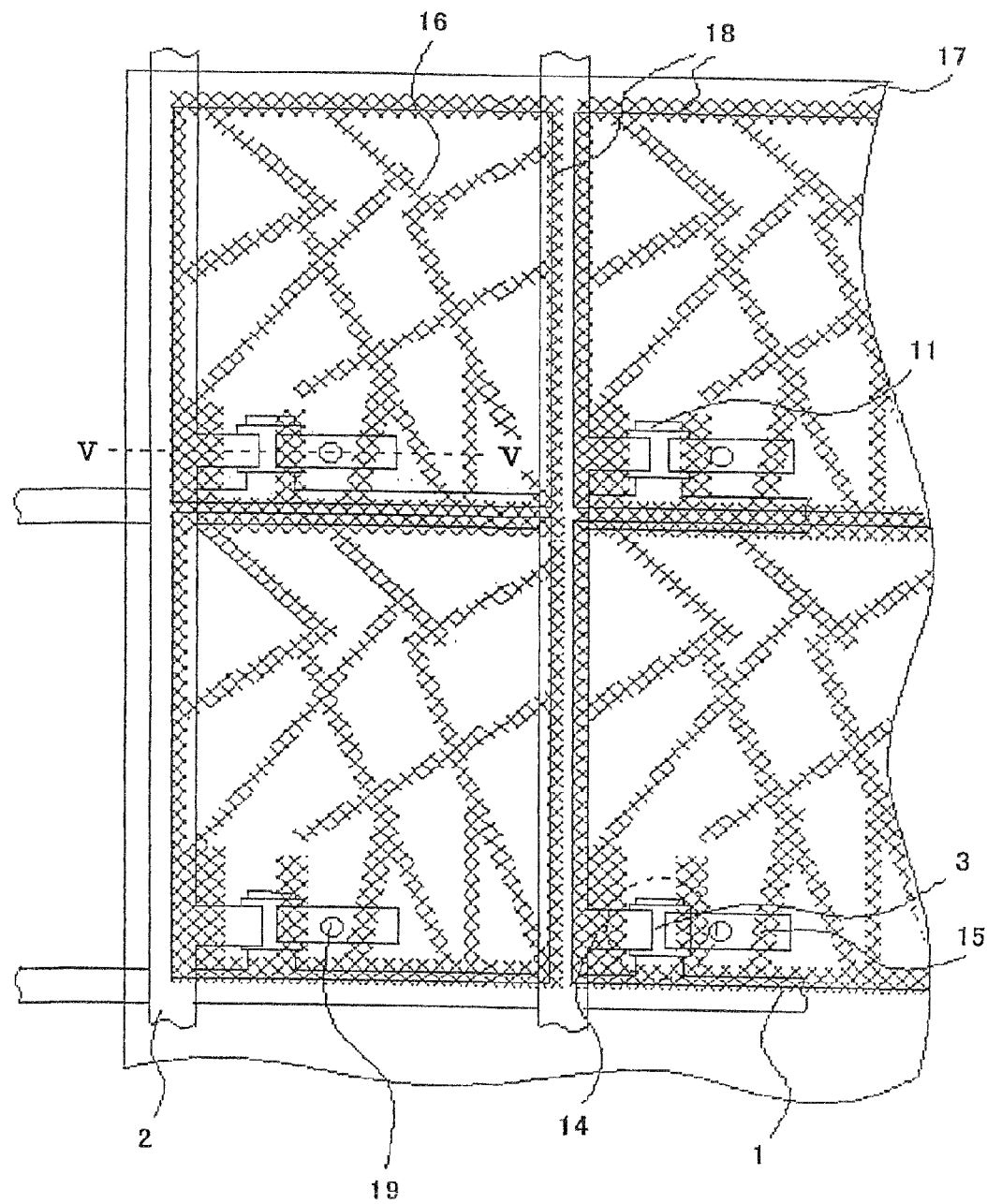
FIG. 4 is a plan view of the reflection type liquid crystal display device in accordance with the first embodiment of the present invention.
Figure 5:
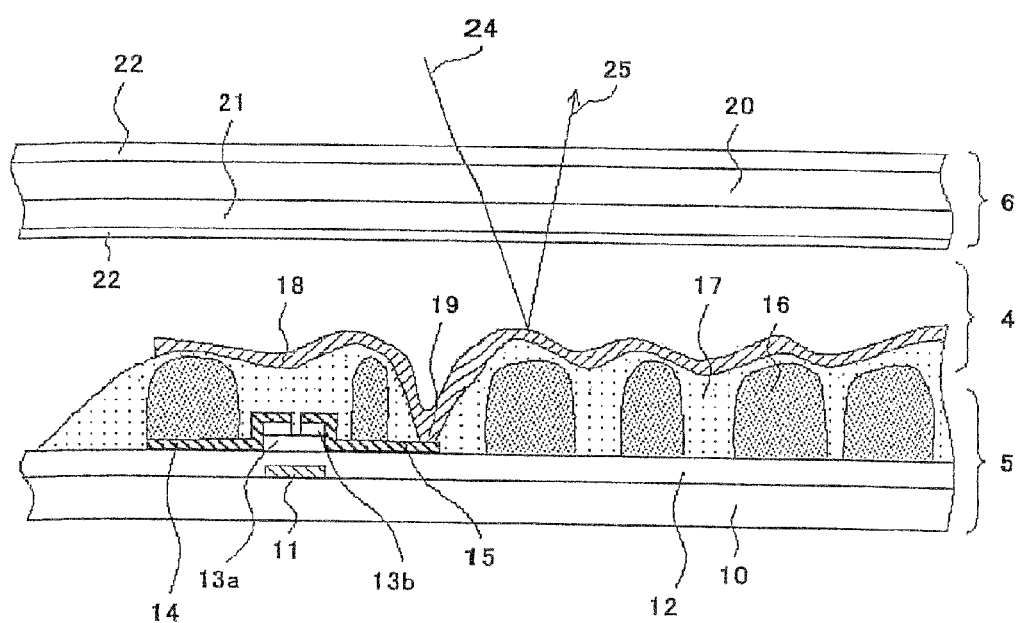
FIG. 5 is a cross-sectional view taken along the line V-V in FIG. 4.

FIG. 4 is a plan view of a reflection type liquid crystal display device in accordance with the first embodiment, and FIG. 5 is a cross-sectional view taken along the line V-V in FIG. 4.

With reference to FIGS. 4 and 5, the reflection type liquid crystal display device is comprised of a TFT substrate 5 on which a thin film transistor (TFT) is formed, an opposing substrate 6 facing and spaced away from the TFT substrate 5, and a liquid crystal display layer 4 sandwiched between the TFT substrate 5 and the opposing substrate 6.

The TFT substrate 5 is comprised of gate lines 1, drain lines 2 extending perpendicularly to the gate lines 1, switching devices each comprised of a thin film transistor 3 formed in each of pixel areas defined by the gate lines 1 and the drain lines 2, a reflection electrode 18 which reflects a light entering the pixel areas and applies a voltage to liquid crystal molecules in the liquid crystal layer 4, a first electrically insulating film 16 formed on the TFT substrate 5, and a second electrically insulating film 17 which cooperates with the first electrically insulating film 16 to present a wavy surface to the reflection electrode 18.

The thin film transistor 3 has a gate electrode 11 electrically connected to the gate line 1, a drain electrode 14 electrically connected to the drain line 2, and a source electrode 15 electrically connected to the reflection electrode 18.

As illustrated in FIG. 5, the TFT substrate 5 is comprised further of a first substrate 10 on which the gate electrode 11 is formed, a gate insulating film 12 formed entirely on the first substrate 10, an amorphous silicon layer 13a formed on the gate insulating film 12, and n+ amorphous silicon layers 13b formed on the amorphous silicon layer 13a.

The drain electrode 14 and the source electrode 15 extend covering both the n+ amorphous silicon layers 13b and the gate insulating film 12 therewith.

The first electrically insulating film 16 is randomly formed in each of pixels in the display area, and is covered with the second electrically insulating film 17 to smooth steps formed by the first electrically insulating film 16.

The first electrically insulating film 16 is randomly formed in the display area in order to have uniform optical reflection characteristic all over the display area, whereas the first electrically film 16 is not formed in a terminal area located outside the display area, because electrode terminals and other parts have to be formed in the terminal area. In FIG. 4, the terminal area extends at the upper and left sides of the illustrated pixels.

The second electrically insulating film 17 is continuously formed in the display area without a contact hole 19, and slightly extends to the terminal area such that an end of the first electrically insulating film 16 does not overlap an end of the second electrically insulating film 17. This ensures that the display area has a smooth step at an end thereof.

As illustrated in FIG. 5, the reflection electrode 18 is electrically connected to the source electrode 15 at the contact hole 19 formed through the second electrically insulating film 17 above the source electrode 15.

The reflection electrode 18 is necessary to be separated into pieces for each of pixels, because the reflection electrode 18 acts also as a pixel electrode for applying a voltage to liquid crystal molecules in the liquid crystal layer 4. Hence, as illustrated in FIG. 4, the reflection electrode 18 is separated along the gate lines 1 and the drain lines 2 for each of pixels.

The opposing substrate 6 is comprised of a second substrate 20, a color filter 21 formed on a first surface of the second substrate 20, a common electrode 22 through which a voltage is applied to liquid crystal molecules in the liquid crystal layer 4, and a polarizing plate 23 formed on a second surface of the second substrate 20.

Liquid crystal molecules in the liquid crystal layer 4 are controlled by a voltage applied across the TFT substrate 5 and the opposing substrate 6.

An incident light 24 passing through the opposing substrate 6 and the liquid crystal layer 4 is reflected at the reflection electrode 18 having the wavy surface, and then, passes again through the liquid crystal layer 4 and the opposing substrate 6, and leaves the liquid crystal display device as an out-going light 25.

The reflection electrode 18 has a wave surface reflecting a wavy surface of the second electrically insulating film 17, and has an optical reflection characteristic defined by angles of raised and recessed portions of the wave surface of the reflection electrode 18. Hence, the angles of the raised and recessed portions of the wave surface of the reflection electrode 18 are determined so as to provide a desired optical reflection characteristic to the reflection electrode 18. For instance, the raised and recessed portions may be defined by two or more of a pitch between raised portion, a pitch between recessed portions, a height of a raised portion, and a depth of a recessed portion.

A lower limit of a thickness of the first electrically insulating film 16 is defined by the above-mentioned optical reflection characteristic, and further by a parasitic capacity. If the first electrically insulating film 16 is formed too thin, it would not be possible to significantly change a direction of reflection of the incident light 24, and a space between the reflection electrode 18 and the gate and drain lines 1 and 2 would be narrowed, resulting in an increase in a parasitic capacity between the reflection electrode 18 and the gate and drain lines 1 and 2, and signal delay. As a result, a signal cannot be properly transmitted, and an electric field between a signal line and a pixel would be intensified, causing disturbance in alignment of liquid crystal molecules, delay in a response, and degradation in quality of displayed images.

From the above-mentioned standpoints, the first electrically insulating film 16 is preferably designed to have a thickness in the range of about 1 µm to about 3 µm.

Since the second electrically insulating film 17 is formed for moderately relaxing the raised and recessed portions of the first electrically insulating film 16 to smooth the wavy surface of the first electrically insulating film 16, if the second electrically insulating film 17 is too thin, the second electrically insulating film 17 could not smooth the wavy surface of the first electrically insulating film 16, whereas if the second electrically insulating film 17 is too thick, the second electrically insulating film 17 would cancel projections and recesses of the first electrically insulating film 16, and would be flattened.

In the first embodiment, the second electrically insulating film 17 is designed to have such a thickness that resist residue does not remain non-removed in an area outside the display area. In accordance with the results of the experiments having been conducted by the inventors, it has been found out that it is preferable for the second electrically insulating film 17 to have a thickness in the range of about 0.3 µm to about 1.5 µm, and a distance between an end of the first electrically insulating film 16 to an end of the second electrically insulating film 17 is preferably in the range of about 10 µm to about 12 µm.

Hereinbelow is explained the reason of selecting the above-mentioned figures, with reference to FIGS. 7 to 9.

Figure 7:
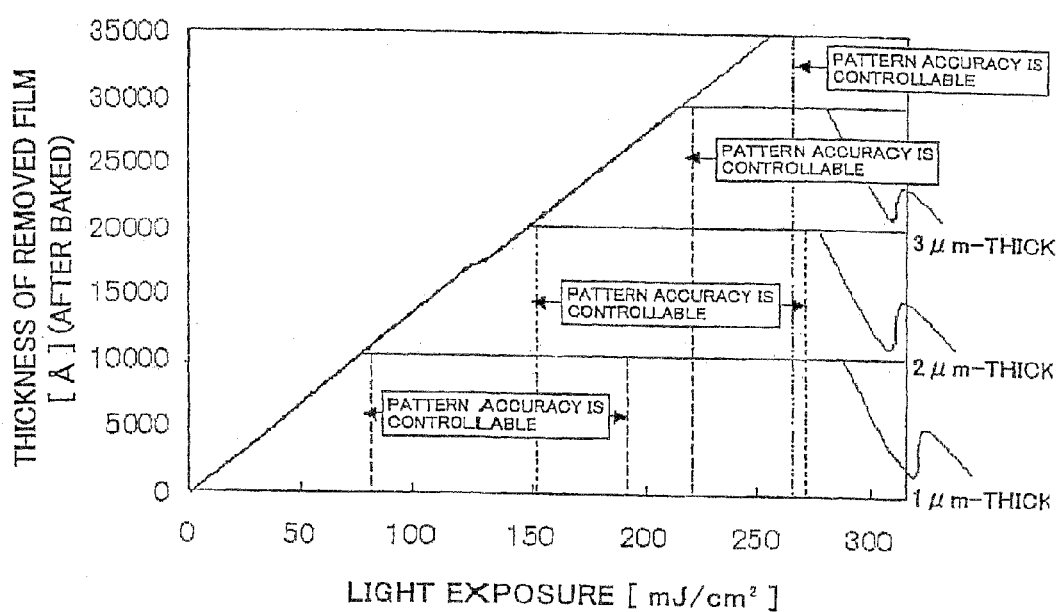
FIG. 7 is a graph showing a relation between a thickness of a resist and light exposure in the reflection type liquid crystal display device in accordance with the first embodiment.
Figure 8:
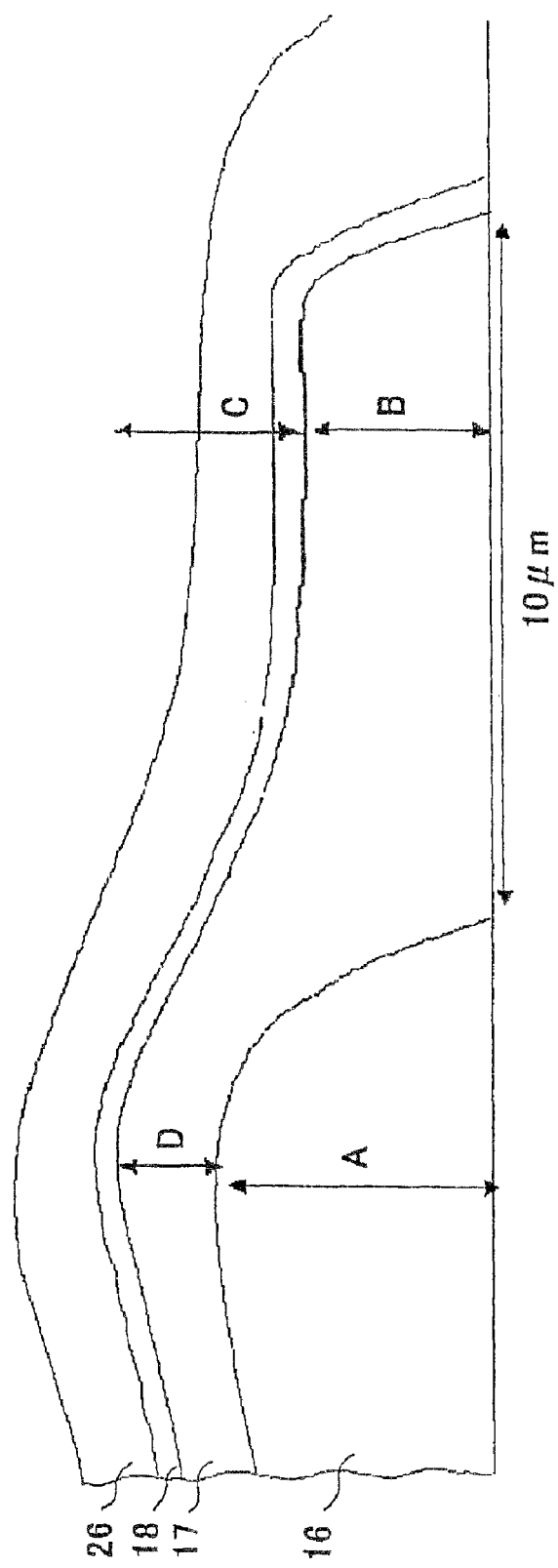
FIG. 8 is a graph showing a relation between a thickness of an electrically insulating film at a periphery of the display area and a thickness of a resist in the reflection type liquid crystal display device in accordance with the first embodiment.
Figure 9:
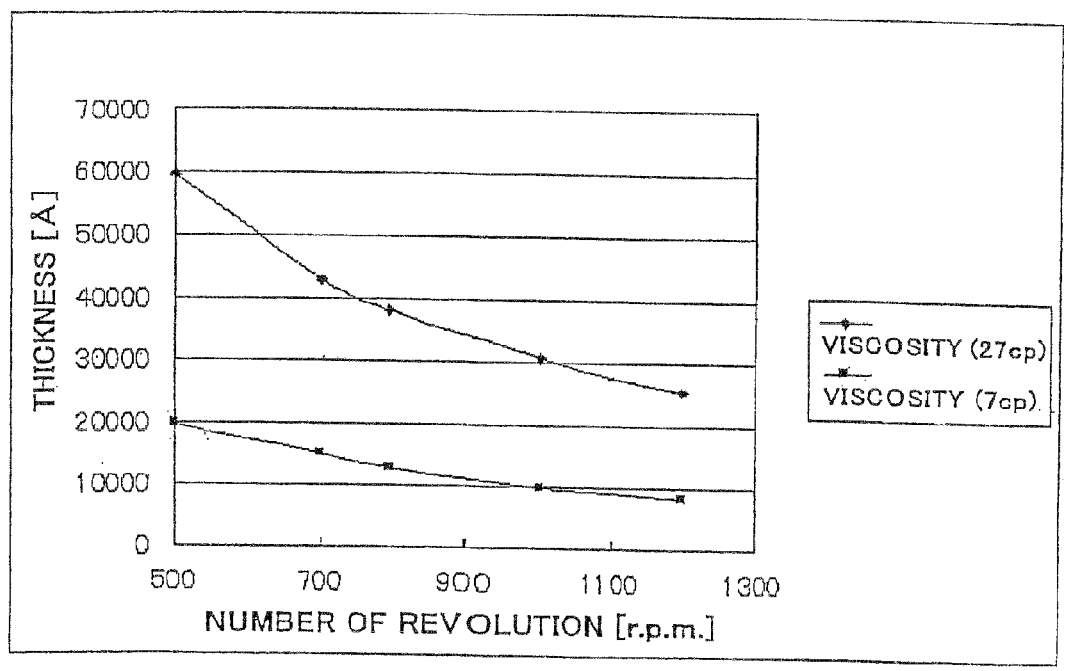
FIG. 9 is a graph showing a relation among a viscosity of a resin, a number of revolution in spin-coating a resin and a thickness in the reflection type liquid crystal display device in accordance with the first embodiment.

FIG. 7 shows a relation between a thickness of a resist and light exposure necessary for removing the resist, FIG. 8 illustrates a positional relation between thicknesses of the first electrically insulating film 16, the second electrically insulating film 17 and the resist 26, and locations of ends of those, and FIG. 9 shows a relation among a viscosity of a resin, a thickness of a resin and a number of revolution for spin-coating.

As illustrated in FIG. 7, greater light exposure is necessary for removing a thicker resist. An accuracy with which a resist having a certain thickness is patterned is controllable for a certain range of light exposure. In other words, the accuracy can be controlled in the certain range of light exposure, though a pattern might be slightly thicker or thinner than designed. For instance, when a resist having a thickness of 1 m is to be patterned, optimal light exposure is about 140 mJ/cm². However, an accuracy with which the resist is patterned can be controlled, if light exposure is in the range of about 80 mJ/cm² to about 190 mJ/cm².

Conversely speaking, a thickness of a resist which can be patterned by certain light exposure has a certain range. If a light is exposed to a resist by 190 mJ/cm², a resist having a thickness of 1 μm can be accurately patterned, and further, a resist having a thickness of 2 μm can be accurately patterned.

Applying the above-mentioned relation to the liquid crystal display device, a thickness of the second electrically insulating film 17 and a distance between ends of the first and second electrically insulating films 16 and 17 are determined in the first embodiment such that a variance in a thickness of a resist to be formed on the reflection electrode 18 is within such a range that an accuracy with which the resist is patterned is controllable.

As illustrated in FIG. 8, assuming that A indicates a thickness of the first electrically insulating film 16, B indicates a thickness of a planarized portion of the second electrically insulating film 17, and D indicates a thickness of a raised portion of the second electrically insulating film 17, a maximum variance in a thickness of the resist 26 is defined by C or equal to B.

$$C = X + D + E - B - E$$

wherein X indicates a thickness of the first electrically insulating film 16, and E indicates a thickness of the reflection electrode 18.

Herein, if the resist 26 had a thickness of 2 μm which is usually selected for photolithography, as is obvious in view of FIG. 7, light exposure by which a resist having a thickness of 2 μm can be patterned is in the range of about 150 mJ/cm² to about 270 mJ/cm², and a resist having a thickness of 3.5 μm at maximum can be patterned by light exposure of 270 mJ/cm².

Accordingly, the thickness C or B has to be equal to or smaller than 1.5 μm (3.5 μm−2 μm=1.5 μm). If the first electrically insulating film 16 is designed to have a thickness in the range of 1 μm and 3 μm taking its optical reflection characteristic into consideration, an upper limit of a thickness of the second electrically insulating film 17 is 1.5 μm, and a lower limit of a thickness of the same is preferably 0.3 μm for making a step defined by the thickness C small.

The thickness B of a planarized portion of the second electrically insulating film 17 becomes smaller as a distance between the ends of the first and second electrically insulating films 16 and 17 becomes greater, and approaches a certain thickness defined by a viscosity. On the other hand, if the distance is too long, the terminal area located outside the display area would be too wide, resulting in that it would be impossible to fabricate the liquid crystal display device in a small size. Hence, the distance is preferably equal to a distance by which the thickness B of a planarized portion of the second electrically insulating film 17 is fixed, that is, about 10 μm, and more preferably equal to about 12 μm taking misregistration in a unit for exposing a resist to a light, into consideration.

In order to design the second electrically insulating film 17 to have a thickness in the above-mentioned range, a viscosity of a resin and/or a number of revolution at which a resin is spin-coated is(are) controlled. For instance, a thickness of the second electrically insulating film 17 can be accurately controlled by spin-coating a resin in accordance with the relation shown in FIG. 9.

In order to reduce a height of the second electrically insulating film 17 (indicated as "B" in FIG. 8) in the terminal area located outside the display area, an angle formed between a surface of the second electrically insulating film 17 and a surface of the first substrate 10 might be determined to be in a certain range by improving wettability of the second electrically insulating film 17 with the first substrate 10 or a passivation film such as a silicon nitride film. Specifically, even if the second electrically insulating film 17 were thick, it would be possible to avoid the problem of resist residue by applying surface treatment such as HMDS to the second electrically insulating film 17 to thereby improved the wettability, and make a contact angle small.

Thus, it would be possible to prevent resist residue from remaining non-removed on the reflection electrode 18, by setting a thickness of the second electrically insulating film 17 or a distance between the ends of the first and second electrically insulating films 16 and 17 to be in a predetermined range. In addition, by relaxing a step formed by the first and second electrically insulating films 16 and 17, an inclination angle formed by inner surfaces of the contact hole 19 could be controlled, ensuring that the reflection electrode 18 and the source electrode 15 are kept in appropriate electrical contact with each other.

Hereinbelow is explained a method of fabricating the above-mentioned reflection type liquid crystal display device, with reference to FIGS. 6A to 6H. In the method mentioned hereinbelow, the thin film transistor 3 acting as a switching device has a reverse-stagger structure.

First, a metal layer composed of chromium, for instance, is formed on the first substrate 10 composed of glass, for instance, by sputtering. Then, the metal layer is patterned into the gate line 1 and the gate electrode 11 by photolithography and etching. The metal layer of which the gate line 1 and the gate electrode 11 are composed may be composed of a metal which has a low resistance and which can be readily patterned by photolithography, such as molybdenum, titanium, aluminum, or aluminum alloy as well as chromium. As an alternative, the metal layer may have a multi-layered structure having an aluminum layer and a barrier metal layer formed on the aluminum layer, wherein the barrier metal layer may be composed of titanium.

Then, a silicon nitride film which will make the gate insulating film 12 is formed all over the first substrate 10. Then, a non-doped amorphous silicon film and a n+-doped amorphous silicon film are successively formed on the gate insulating film 12 by chemical vapor deposition (CVD). Thereafter, those amorphous silicon layers are patterned into the amorphous silicon layer 13a and the n+ amorphous silicon layer 13b. The amorphous silicon layer 13a acts as an active layer in the thin film transistor 3, and the n+ amorphous silicon layer 13b ensures ohmic contact between the drain electrode 14, the source electrode 15 and the amorphous silicon layer 13a.

Then, a chromium film is formed over the amorphous silicon layer 13a and the n+ amorphous silicon layer 13b by sputtering, and subsequently, patterned into the drain electrode 14 and the source electrode 15. Then, the n+ amorphous silicon layer 13b is dry-etched in an area in alignment with a space formed between the drain electrode 14 and the source electrode 15. This is for the purpose of preventing a current from running directly through the drain electrode 14 and the source electrode 15 via the n+ amorphous silicon layer 13b.

Then, a silicon nitride film is formed over the first substrate 10 by CVD, and subsequently, patterned into a passivation film (not illustrated). The passivation film prevents impurities such as ions from diffusing into the amorphous silicon layer 13a to thereby cause malfunction in the thin film transistor 3.

By carrying out the above-mentioned steps, the thin film transistor 3 is fabricated in the TFT substrate 5, as illustrated in FIG. 6A.

Then, as illustrated in FIG. 6B, the first electrically insulating film 16 is formed on the gate insulating film 12 randomly in the display area.

Then, as illustrated in FIG. 6C, a process for changing a shape is applied to the first electrically insulating film 16 to thereby round the first electrically insulating film 16 at corners.

Then, as illustrated in FIG. 6D, the second electrically insulating film 17 is formed entirely covering the first electrically insulating film 16 therewith, and then, there is formed the contact hole 19 throughout the second electrically insulating film 17 above the source electrode 15 for electrically connecting the reflection electrode 18 and the source electrode 15 to each other.

The first electrically insulating film 16 and the second electrically insulating film 17 are formed entirely in the display area, and the second electrically insulating film 17 is formed in such a way that the second electrically insulating film 17 extends outwardly beyond the end of the first electrically insulating film 16 in an area (that is, an area located at the left in FIG. 6D) outside a pixel located at an outer periphery of the display area, thereby avoiding a steep step to be formed by the first and second electrically insulating films 16 and 17.

The first electrically insulating film 16 may be composed of photo-insensitive resin or photosensitive resin.

If the first electrically insulating film 16 were composed of photo-insensitive resin, the method of fabricating the liquid crystal display device would include the steps of (a) forming the first electrically insulating film 16 on the first substrate 19, (b) forming a resist for patterning the first electrically insulating film 16, (c) exposing the resist to a light, (d) developing the resist, (e) etching the first electrically insulating film 16, and (e) removing the resist.

If the first electrically insulating film 16 were composed of photo-sensitive organic or inorganic material, the method of fabricating the liquid crystal display device would include the steps of (a) forming the first electrically insulating film 16 on the first substrate 19, (b) exposing the first electrically insulating film 16 to a light, and (c) developing the first electrically insulating film 16. The method may omit the steps of forming a resist for patterning the first electrically insulating film 16, and removing the resist, in comparison with the method in which the first electrically insulating film 16 is composed of photo-insensitive resin.

In the step having been explained with reference to FIG. 6C, the patterned first electrically insulating film 16 is molten to have rounded corners, by annealing the first electrically insulating film 16 at a temperature in the range of 80 to 300 degrees centigrade. As an alternative, the first electrically insulating film 16 may be molten to have rounded corners through the use of chemical instead of annealing the first electrically insulating film 16. If the second electrically insulating film 17 only could present a sufficiently smooth wavy surface, it would not be always necessary to apply any process to the first electrically insulating film 16 to have rounded corners.

In the first embodiment, the first and second electrically insulating films 16 and 17 were composed of polyimide commercially available from Nissan Kagaku Industry Co. Ltd., under the trade name of "RN-812". The conditions of coating the polyimide were as follows.

Number of revolution in spin-coating: 1200 r.p.m.
Temporarily baking temperature: 90 degrees centigrade
Temporarily baking time: 10 minutes
Baking temperature: 250 degrees centigrade
Baking time: 1 hour The resist used for patterning the electrically insulating films 16 and 17 were formed in the following conditions.

Number of revolution in spin-coating: 1000 r.p.m.
Temporarily baking temperature: 90 degrees centigrade
Temporarily baking time: 5 minutes
Post baking temperature (after patterning): 90 degrees centigrade
Post baking time: 30 minutes The conditions for dry-etching the above-mentioned polyimide film with the patterned resist being used as a mask were as follows.

Etching gas: $FCl_4+O_2$
Gas flow ratio ($FC_4/O_2$): 0.5-1.5
Reaction pressure: 0.665-39.9 Pa
Plasma power: 100-300 W The photolithography was carried out under ordinary resist processes.

Though the first and second electrically insulating films 16 and 17 are composed of the same organic resin in the first embodiment, they may be composed of different materials from each other. The second electrically insulating film 17 could have a desired wavy surface by composing the first and second electrically insulating films 16 and 17 of a combination of inorganic material and organic material such as acrylic resin and polyimide resin, silicon nitride and acrylic resin, silicon dioxide and polyimide or vice versa. In addition, if the second electrically insulating film 17 could be designed to have a sufficiently smooth wavy surface, the first electrically insulating film 16 might be formed by evaporation, sputtering or CVD, as well as coating.

Figure 6E:
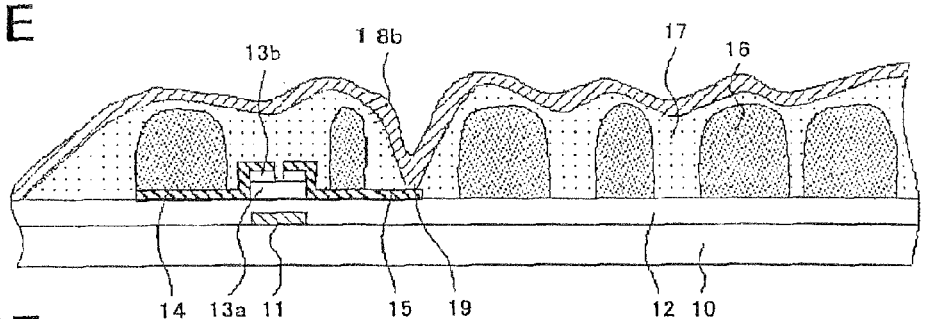

Then, as illustrated in FIG. 6E, a metal film 18b composed of metal having a high reflectivity is formed entirely over the second electrically insulating film 17.

Figure 6F:
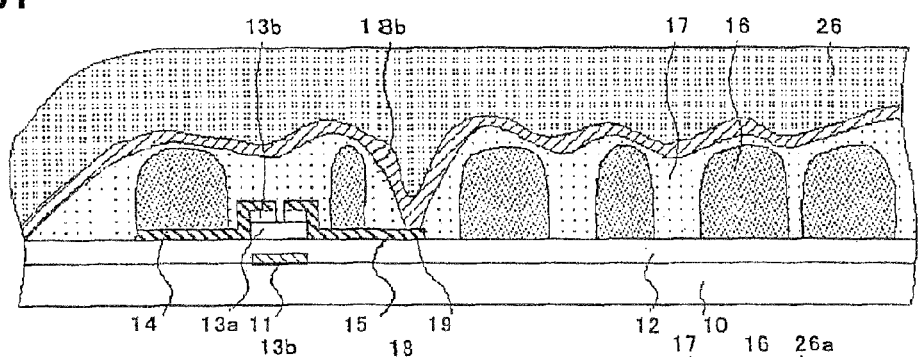

Then, as illustrated in FIG. 6F, a resist 26 is formed entirely covering the metal film 18b.

Figure 6G:
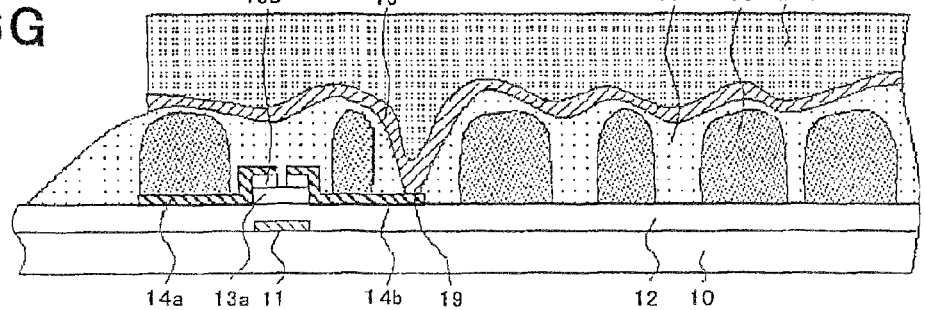

Then, as illustrated in FIG. 6G, the resist 26 is patterned by being exposed to a light and developed into a resist pattern 26a covering only an area in which the reflection electrode 18 is to be formed.

Then, the metal film 18b is etched with the resist pattern 26a being used as a mask. As a result, the metal film 18b is removed in areas between adjacent pixels, specifically, above the gate line 1 and the drain line 2, and further in the terminal area extending outside a pixel located outermost in the display area, in order to allow the resultant reflection electrode 18 to be electrically connected to the source electrode 15 in each of pixel and act as a pixel electrode.

Figure 6H:
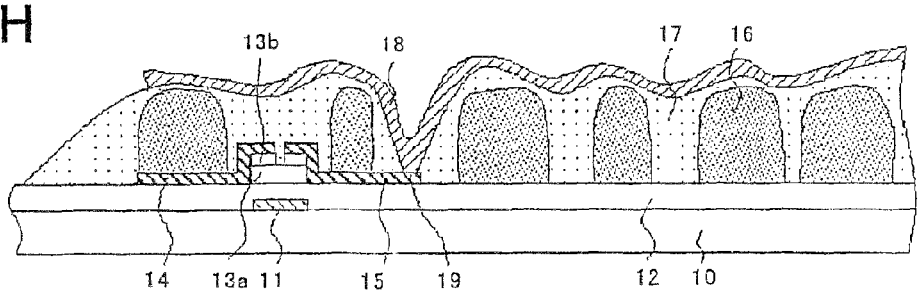

Thereafter, the resist pattern 26a is removed. Thus, there is fabricated the TFT substrate 5 as illustrated in FIG. 6H.

In the first embodiment, the reflection electrode 18 is composed of aluminum which has high reflection ratio, and well matches with TFT process. By patterning the aluminum, the resultant reflection electrode 18 acting as a pixel electrode and a reflection plate was formed. The aluminum was wet-etched through the use of an etchant composed of mixture of phosphoric acid, acetic acid and nitric acid and heated at 60 degrees centigrade. However, it should be noted that the reflection electrode 18 might be composed any metal, if it had high reflectivity, other than aluminum. For instance, the reflection electrode 18 may be composed of silver or silver alloy which has higher reflection ratio than that of aluminum, ensuring brighter reflection performance than that of aluminum.

After alignment process was applied, the TFT substrate 5 and the opposing substrate 6 were adhered to each other by applying an epoxy adhesive to marginal portions of the substrates 5 and 6 with spacers such as plastic particles being sandwiched therebetween such that the electrically insulating film 17 formed on the TFT substrate 5 and the common electrode 22 formed on the opposing substrate 6 faced each other. Thereafter, liquid crystal was injected into a space formed between the TFT substrate 5 and the opposing substrate 6 to thereby form the liquid crystal layer 4.

Figure 1:
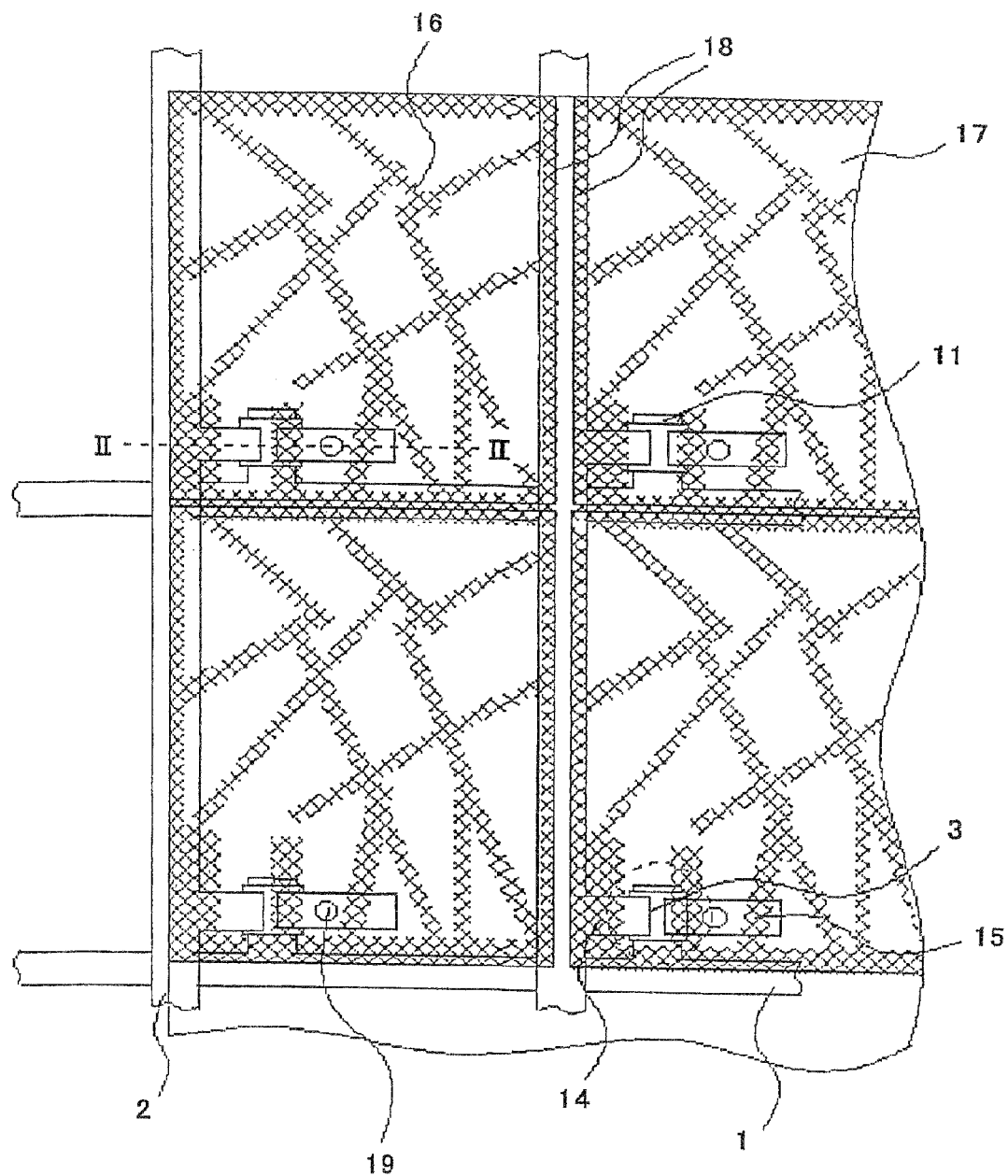
FIG. 1 is a plan view of a conventional reflection type liquid crystal display device.
Figure 2:
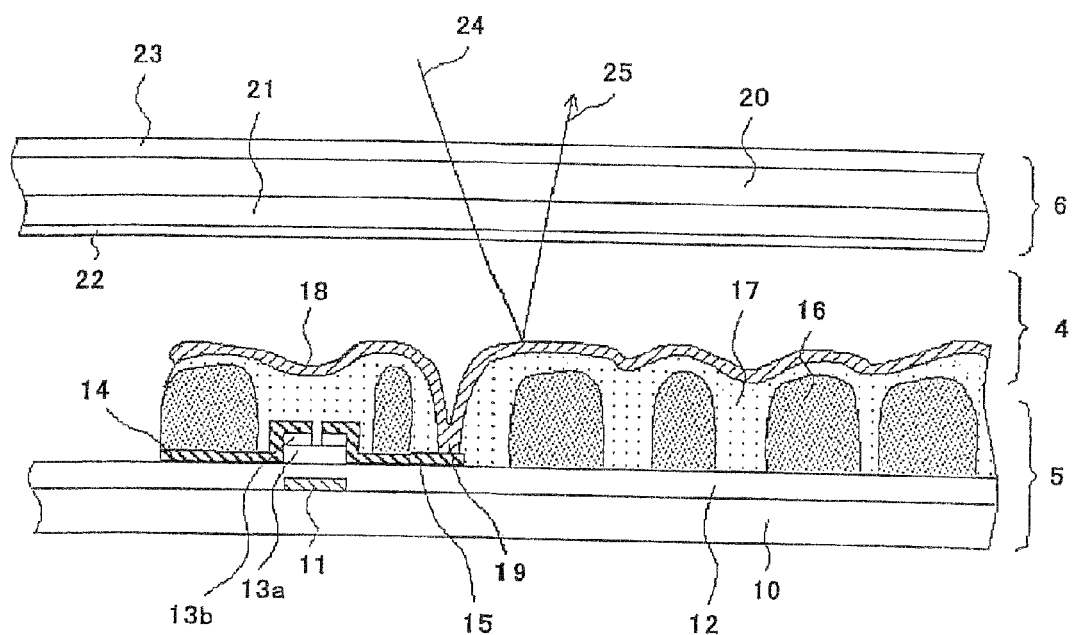
FIG. 2 is a cross-sectional view taken along the line II-II in FIG. 1.
Figure 3A:
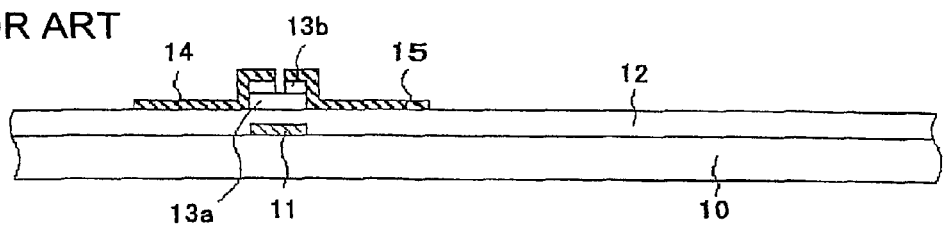
FIGS. 3A to 3H are cross-sectional views each illustrating a step of a method of fabricating a substrate on which a thin film transistor (TFT) is to be fabricated, in the conventional reflection type liquid crystal display device illustrated in FIG. 1.
Figure 3B:
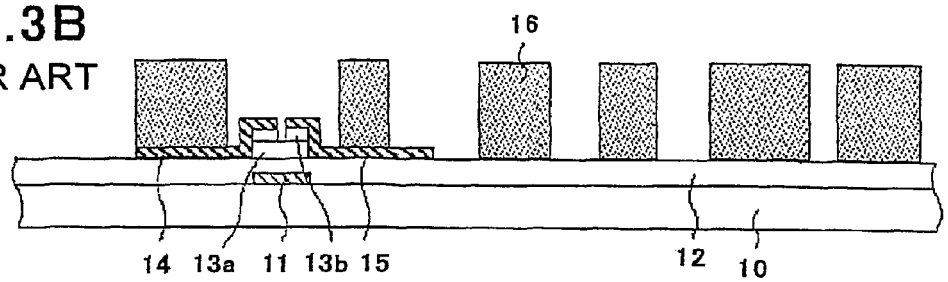
Figure 3C:
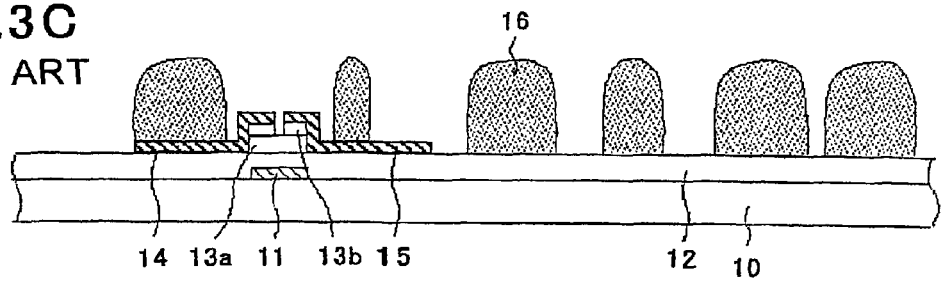
Figure 3D:
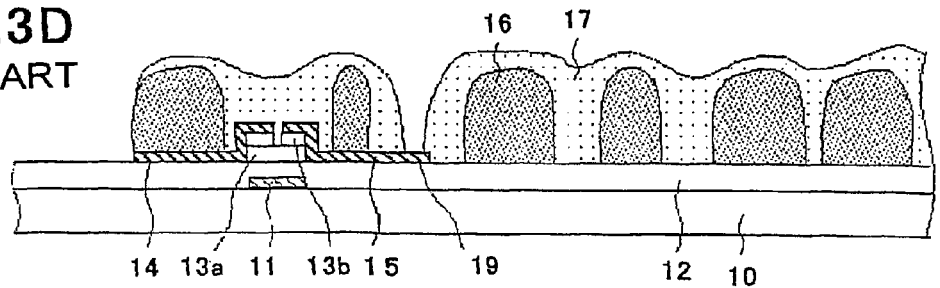
Figure 3E:
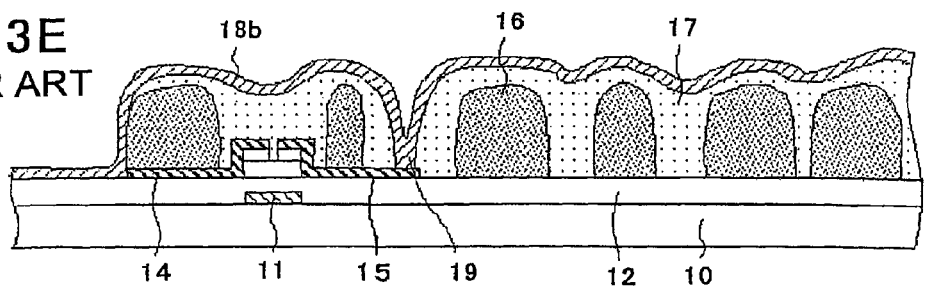
Figure 3F:
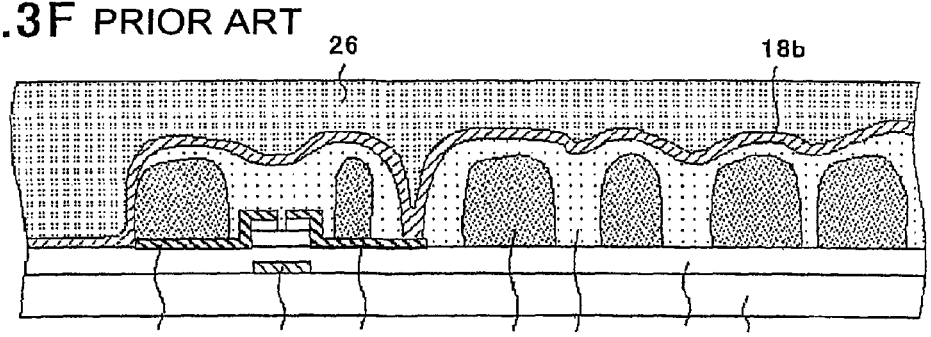
Figure 3G:
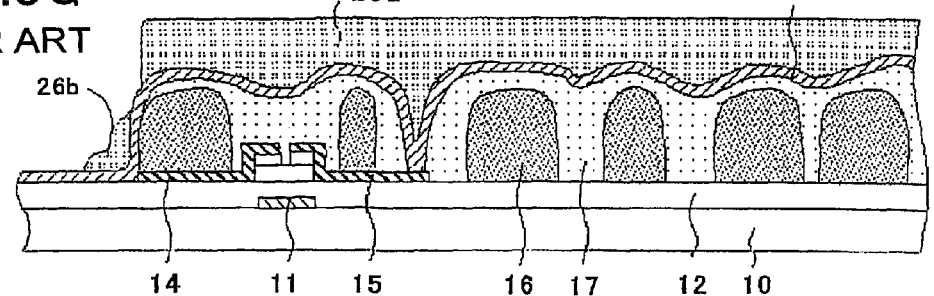
Figure 3H:
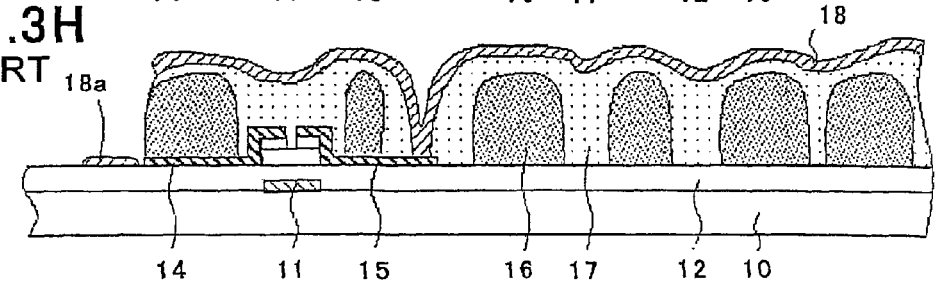

In the above-mentioned liquid crystal display device in which the second electrically insulating film 17 cooperates with the first electrically insulating film 16 to form the wavy surface, and the reflection electrode 18 is formed on the wavy surface of the second electrically insulating film 17, the second electrically insulating film 17 is designed to have its end deviated from an end of the first electrically insulating film 16 in the terminal area extending outside a pixel located outermost in the display area, specifically, the second electrically insulating film 17 extends outwardly from an end of the first electrically insulating film 16, and in addition, the second electrically insulating film 17 is designed to have a thickness in the predetermined range. The above-mentioned structure of the liquid crystal display device in accordance with the first embodiment would prevent a variance in a thickness of the resist used for patterning the reflection electrode 18, and thereby, further prevent unintentional parasitic capacity and short-circuiting between adjacent pixels both caused by the non-removed portion 18a of the reflection electrode 18 (see FIG. 3G).

The thin film transistor 3 as a switching device may be comprised of a stagger type thin film transistor or MIM diode. Even if the thin film transistor 3 is designed to have a reverse-stagger structure, the reverse-stagger structure is not to be limited to such a structure as mentioned in the first embodiment, but may have other structures.

Though each of the first and second substrates 10 and 20 is comprised of a glass substrate in the first embodiment, they may be comprised of a plastic substrate, a ceramics substrate or a semiconductor substrate. In addition, the first embodiment may be applied to a display device including optical materials other than liquid crystal.

Second Embodiment

Hereinbelow is explained a method of fabricating a TFT substrate in the reflection type liquid crystal display device in accordance with the second embodiment, with reference to FIGS. 10A to 10H. The second embodiment has an object of simplifying a method of fabricating a TFT substrate. Parts other than the TFT substrate in the second embodiment are fabricated in the same manner as the first embodiment.

Similarly to the first embodiment, first, a metal layer composed of chromium, for instance, is formed on the first substrate 10 composed of glass, for instance, by sputtering. Then, the metal layer is patterned into the gate line 1 and the gate electrode 11 by photolithography and etching Then, a silicon nitride film which will make the gate insulating film 12 is formed all over the first substrate 10. Then, a non-doped amorphous silicon film and a n+-doped amorphous silicon film are successively formed on the gate insulating film 12 by CVD. Thereafter, those amorphous silicon layers are patterned into the amorphous silicon layer 13a and the n+ amorphous silicon layer 13b.

Then, a chromium film is formed over the amorphous silicon layer 13a and the n+ amorphous silicon layer 13b by sputtering, and subsequently, patterned into the drain electrode 14 and the source electrode 15. Then, the n+ amorphous silicon layer 13b is dry-etched in an area in alignment with a space formed between the drain electrode 14 and the source electrode 15, to thereby form a channel region.

Then, a silicon nitride film is formed over the first substrate 10 by CVD, and subsequently, patterned into a passivation film (not illustrated).

Figure 10A:
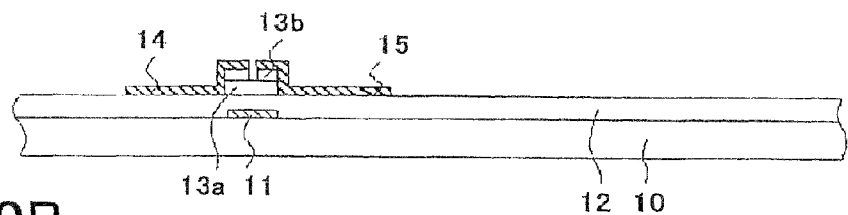
FIGS. 10A to 10H are cross-sectional views each illustrating a step of a method of fabricating a substrate on which a thin film transistor (TFT) is to be fabricated, in the reflection type liquid crystal display device in accordance with the second embodiment of the present invention.

Thus, as illustrated in FIG. 10A, the thin film transistor 3 is fabricated on the first substrate 10.

Whereas the first and second electrically insulating films 16 and 17 are formed in separate steps in the above-mentioned first embodiment, they are formed in a single step for simplifying the method of fabricating the liquid crystal display device, in the second embodiment, as follows.

Figure 10B:
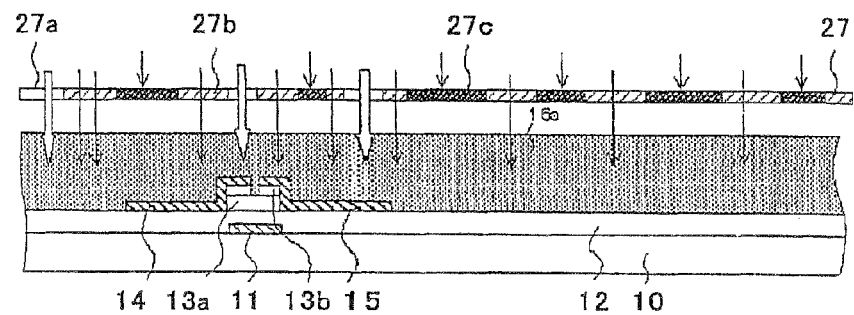

As illustrated in FIG. 10B, an electrically insulating and photo-sensitive film 16a composed of organic or inorganic material is coated all over the gate insulating film 12. Similarly to the first embodiment, the electrically insulating and photo-sensitive film 16a is comprised of a polyimide film, and coated in the following conditions.

Number of revolution in spin-coating: 1200 r.p.m.
Temporarily baking temperature: 90 degrees centigrade
Temporarily baking time: 10 minutes
Baking temperature: 250 degrees centigrade
Baking time: 1 hour The second embodiment is characterized in that a half-tone mask 27 is used for exposing the electrically insulating and photo-sensitive film 16a to a light, and developing the same. As illustrated in FIG. 10B, the half-tone mask 27 is designed to include a light-permeable portion 27a through which a light can pass, a half-light-permeable portion 27b through which a light can pass after being attenuated to some degree, and a light-impermeable portion 27c through which a light cannot pass. The half-tone mask 27 is positioned above the electrically insulating film 16a such that the light-impermeable portion 27c will define a raised portion, the half-light-impermeable portion 27b will define a recessed portion, and the light-permeable portion 27a will define an area in which the electrically insulating film 16a is entirely removed.

Figure 10C:
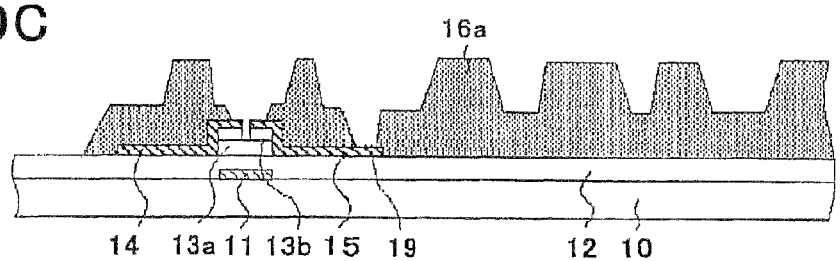

Then, the electrically insulating and photo-sensitive film 16a is exposed to a light through the half-tone mask 27, and then, developed. As a result, as illustrated in FIG. 10C, the electrically insulating and photo-sensitive film 16a remains non-removed in an area in alignment with the light-impermeable portion 27c, and is etched to some degree in an area in alignment with the half-light-permeable portion 27b. Thus, the electrically insulating and photo-sensitive film 16a has raised and recessed portions, as illustrated in FIG. 10C.

In the half-tone mask 27, the half-light-permeable portion 27b is designed to be located adjacent to the light-permeable portion 27a in order for the electrically insulating film 16a not to have a steep step.

By using the half-tone mask 27, the electrically insulating film 16a is entirely removed in an area in alignment with the light-permeable portion 27a by being exposed to a light for a long time or being exposed to an intensive light, the electrically insulating film 16a is removed to some degree in an area in alignment with the half-light-permeable portion 27b by being exposed to a light for a short time or being exposed to a weak light, or the electrically insulating film 16a is not removed at all in an area in alignment with the light-impermeable portion 27c by not being exposed to a light. As a result, it would be possible to form both the first and second electrically insulating films 16 and 17 in a single step.

Figure 10D:
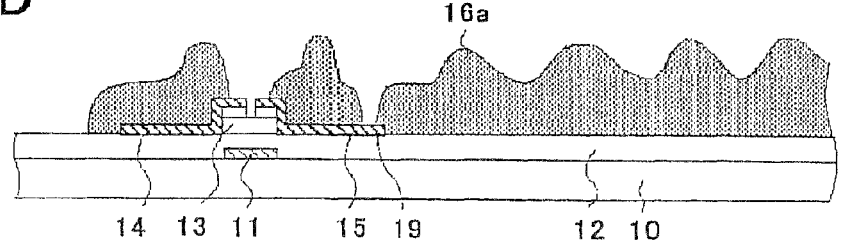

Then, as illustrated in FIG. 10D, a process for changing a shape is applied to the electrically insulating film 16a to thereby round the electrically insulating film 16a at corners thereof. Specifically, the electrically insulating film 16a is molten to have rounded corners, by being annealed at a temperature in the range of 80 to 300 degrees centigrade. As an alternative, the electrically insulating film 16a may be molten to have rounded corners through the use of chemical instead of annealing the electrically insulating film 16a. If the electrically insulating film 16a could form the raised and recessed portions only by development, it would not be always necessary to apply any shape-changing process to the electrically insulating film 16a to have rounded corners.

Figure 10E:
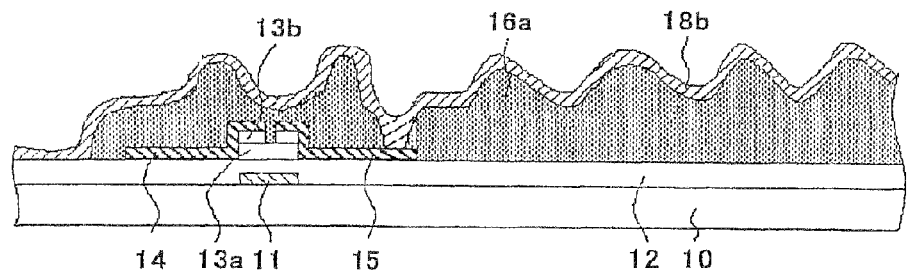

Then, similarly to the first embodiment, a metal film 18b composed of metal having a high reflectivity is formed entirely over the first substrate 10, as illustrated in FIG. 10E.

Figure 10F:
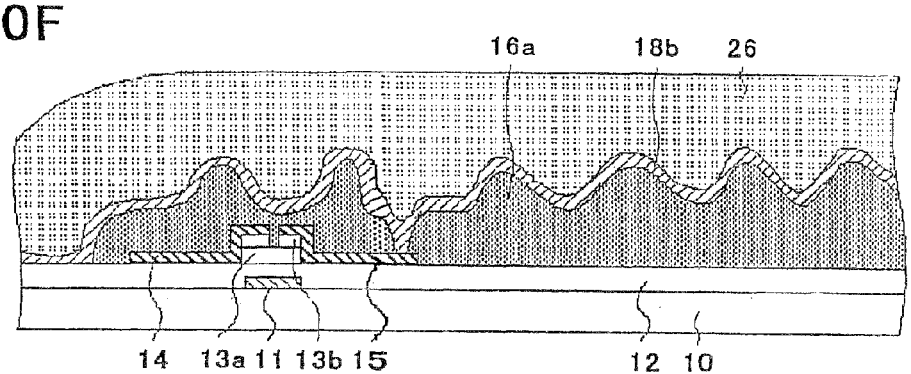

Then, as illustrated in FIG. 10F, a resist 26 is formed entirely covering the metal film 18b.

Figure 10G:
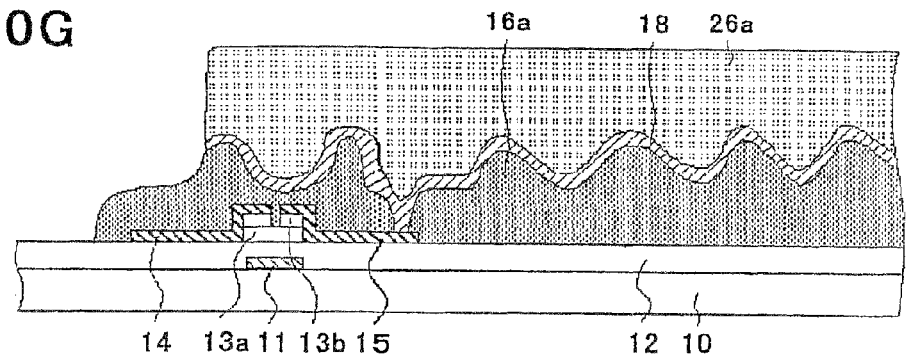

Then, as illustrated in FIG. 10G, the resist 26 is patterned by being exposed to a light and developed into a resist pattern 26a covering only an area in which the reflection electrode 18 is to be formed.

Then, the metal film 18b is etched with the resist pattern 26a being used as a mask. As a result, the metal film 18b is removed in areas between adjacent pixels, specifically, above the gate line 1 and the drain line 2, and further in the terminal area extending outside a pixel located outermost in the display area, in order to allow the resultant reflection electrode 18 to be electrically connected to the source electrode 15 in each of pixel and act as a pixel electrode.

Figure 10H:
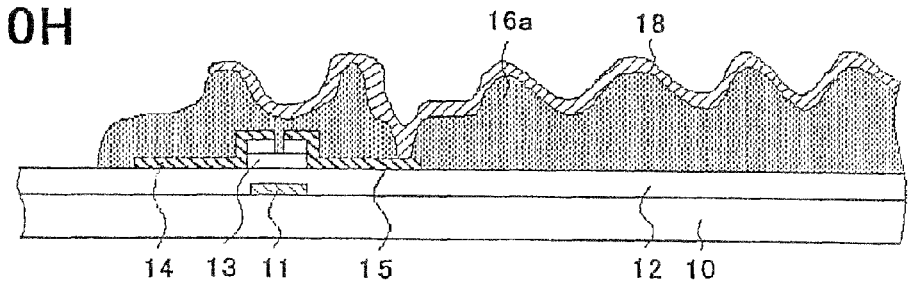

Thereafter, the resist pattern 26a is removed. Thus, there is fabricated the TFT substrate 5 as illustrated in FIG. 10H.

As mentioned above, the use of the half-tone mask 27 would make it possible to form the electrically insulating film 16a in a single step, ensuring reduction in the number of fabrication steps in comparison with the first embodiment.

In addition, in the terminal area extending outside a pixel located outermost in the display area, the electrically insulating film 16a is removed to some degree in area outside an area in which the electrically insulating film 16a is not removed at all. Accordingly, the electrically insulating film 16a would not form a steep step, which ensures prevention of generation of the resist residue 26b, and further of unintentional generation of parasitic capacity caused by the non-removed portion 18a of the reflection electrode 18.

In the above-mentioned second embodiment, the electrically insulating film 16a has raised and recessed portions through the use of the half-tone mask 27. Instead of using the half-tone mask 27, there may be used a first mask for removing the electrically insulating film 16a only to a degree and a second mask for not removing the electrically insulating film 16a, wherein light exposure through the first and second masks are varied. As an alternative, the half-light-impermeable portion may be formed by means of a mask having a pattern smaller than an upper limit of exposure ability. As an alternative, light exposure may be varied in areas of the electrically insulating film 16a.

In the above-mentioned first and second embodiments, the second electrically insulating film 17 is designed to have its end deviated from an end of the first electrically insulating film 16 in the terminal area extending outside a pixel located outermost in the display area, specifically, the second electrically insulating film 17 extends outwardly from an end of the first electrically insulating film 16, and in addition, the second electrically insulating film 17 is designed to have a thickness in the predetermined range. Thereby, it would be possible to prevent a variance in a thickness of the resist used for patterning the reflection electrode 18, and, further prevent unintentional parasitic capacity and short-circuiting between adjacent pixels both caused by the non-removed portion 18a of the reflection electrode 18 (see FIG. 3G).

The above-mentioned first and second embodiments may be applied to a contact area where the reflection electrode 18 is electrically connected to the source electrode 15 of the thin film transistor 3. Specifically, the second electrically insulating film 17 is designed to extend inwardly from the first electrically insulating film 16 by a certain length at the contact area. This ensures that a step formed by the first and second electrically insulating films 16a and 17 in the vicinity of the contact are can be smoothed. Hence, it would be possible to have the same advantages as those presented by the first and second embodiments.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2001-024237 filed on Jan. 31, 2001 including specification, claims, drawings and summary is incorporated herein by reference in its entirety.

The invention claimed is:

1. A liquid crystal display device comprising: (a) a first substrate;
   (b) a second substrate facing and spaced away from said first substrate;
   second substrates;
   (d) a switching device formed on said first substrate;
   (e) an electrically insulating film covering said first substrate and having a thin region and thick region formed by a single exposure process; and
   (f) a reflection electrode electrically connected to said switching device,
   wherein said reflection electrode is formed on a wavy surface formed by said electrically insulating film, and said reflection electrode reflects a light passing through both said second substrate and said liquid crystal layer, and
   wherein said thin region extends outwardly from an outmost portion of said thick region by a certain length at an edge of a display region in which images are to be displayed such that the extension has an outwardly tapered and substantially triangular cross section.

2. The liquid crystal display device as set forth in claim 1, wherein said certain length is in the range of about 10 μm to about 12 μm both inclusive.

3. The liquid crystal display device as set forth in claim 1, wherein said thin region has a thickness in the range of about 0.3 μm to about 1.5 μm both inclusive.

4. The liquid crystal display device as set forth in claim 1, wherein said thick region has a thickness in the range of about 1 μm to about 3 μm both inclusive.

5. The liquid crystal display device as set forth in claim 1, wherein said electrically insulating film is composed of thermo-flexible organic or inorganic material.

6. A liquid crystal display device comprising:
   (a) a first substrate;
   (b) a second substrate facing and spaced away from said first substrate;

(c) a liquid crystal layer sandwiched between said first and second substrates;

(d) a switching device formed on said first substrate;

(e) an electrically insulating film covering said first substrate and is formed in a display area in which images are to be displayed; and (f) a reflection electrode electrically connected to said switching device, wherein said reflection electrode is formed on a wavy surface formed by said electrically insulating film, and said reflection electrode reflects a light passing through both said second substrate and said liquid crystal layer, and said electrically insulating film further has an extension extending by a certain length from inside of said display area to outside thereof such that said extension has an outwardly tapered and substantially triangular cross section.

7. The liquid crystal display device as set forth in claim 6, wherein the wavy surface of the electrically insulating film is formed by a single exposure process.

8. The liquid crystal display device as set forth in claim 6, wherein said certain length is in a range of about 10 μm to about 12 μm both inclusive.

9. The liquid crystal display device as set forth in claim 6, wherein said electrically insulating film has a first electrically insulating film formed on the first substrate and a second electrically insulating film covering the first electrically insulating film, and the second electrically insulating film has a thickness in a range of about 0.3 μm to about 1.5 μm both inclusive.

10. The liquid crystal display device as set forth in claim 9, wherein the first electrically insulating film has a thickness in the range of about 1 μm to about 3 μm both inclusive.

11. The liquid crystal display device as set forth in claim 6, wherein said electrically insulating film is composed of thermo-flexible organic or inorganic material.

\* \* \* \* \*